United States Patent
Sako et al.

(10) Patent No.: US 7,287,167 B2
(45) Date of Patent: Oct. 23, 2007

(54) RECORD MEDIUM, RECORDING APPARATUS FOR RECORD MEDIUM, RECORDING METHOD FOR RECORD MEDIUM, REPRODUCING APPARATUS FOR RECORD MEDIUM, REPRODUCING MEDIUM FOR RECORD MEDIUM, AND DATA OUTPUT CONTROLLING METHOD

(75) Inventors: Yoichiro Sako, Tokyo (JP); Tatsuya Inokuchi, Kanagawa (JP)

(73) Assignee: Sony Corporation (JP)

( * ) Notice: Subject to any disclaimer, the term of this patent is extended or adjusted under 35 U.S.C. 154(b) by 813 days.

(21) Appl. No.: 09/955,888

(22) Filed: Sep. 19, 2001

(65) Prior Publication Data

US 2002/0056048 A1 May 9, 2002

(30) Foreign Application Priority Data

Sep. 20, 2000 (JP) .......................... P2000-286208

(51) Int. Cl.
*G06F 12/14* (2006.01)
*H04L 9/00* (2006.01)

(52) U.S. Cl. .................. 713/193; 713/165; 726/33
(58) Field of Classification Search ............... 713/193, 713/165; 726/33
See application file for complete search history.

(56) References Cited

U.S. PATENT DOCUMENTS

| | | | | |
|---|---|---|---|---|
| 5,513,260 | A * | 4/1996 | Ryan | 380/200 |
| 6,081,897 | A * | 6/2000 | Bersson | 726/32 |
| 6,209,092 | B1 * | 3/2001 | Linnartz | 713/176 |
| 6,222,807 | B1 * | 4/2001 | Min-Jae | 369/47.12 |
| 6,490,683 | B1 * | 12/2002 | Yamada et al. | 713/176 |
| 6,496,898 | B1 * | 12/2002 | Tsutsui | 711/112 |
| 6,542,870 | B1 * | 4/2003 | Matsumoto | 705/1 |
| 6,574,609 | B1 * | 6/2003 | Downs et al. | 705/50 |
| 6,584,275 | B1 * | 6/2003 | Blatter | 386/94 |
| 6,615,192 | B1 * | 9/2003 | Tagawa et al. | 705/57 |
| 6,834,348 | B1 * | 12/2004 | Tagawa et al. | 713/193 |
| 6,857,071 | B1 * | 2/2005 | Nakae | 713/156 |
| 6,865,676 | B1 * | 3/2005 | Staring et al. | 713/176 |
| 6,993,133 | B1 * | 1/2006 | Nonomura et al. | 380/252 |

FOREIGN PATENT DOCUMENTS

EP 715241 A2 * 6/1996
EP 967783 A2 * 12/1999

OTHER PUBLICATIONS

McCready, Michael, "How to Register Your Copyright," Dec. 1, 1998, pp. 1-2. <http://www.music-law.com/registercopyright.html>.*
Kaplan, Mare A. "IBM Cryptolopes, SuperDistribution and Digital Rights Management," Jun. 6, 1997, pp. 1-10. <http://web.archive.org/web/19970606194526/http://www.research.ibm.com/people/k/kaplan/cryptolope-docs/crypap.html>.*

* cited by examiner

*Primary Examiner*—Emmanuel L. Moise
*Assistant Examiner*—Michael Pyzocha
(74) *Attorney, Agent, or Firm*—Lerner, David, Littenberg, Krumholz & Mentlik, LLP

(57) ABSTRACT

A recording method for a record medium is disclosed, that comprises the steps of adding right information containing at least copyright management information to at least one of a plurality of pieces of input data, and performing a signal process for the plurality of pieces of the input data in the unit of data to which the right information has been added so as to record the processed data to the record medium.

1 Claim, 7 Drawing Sheets

Fig. 6

| ALBUM | MUSIC PROGRAM | COPY (MUSIC PROGRAM) | COPY (ALBUM) | FEE (MUSIC PROGRAM) | FEE (ALBUM) |
|---|---|---|---|---|---|
| A1 | 1 | OK | OK | ¥100 | ¥1000 |
| | 2 | OK | | ¥100 | |
| | 3 | NO | | ¥200 | |
| | 4 | NO | | ¥200 | |
| | 5 | NO | | ¥100 | |
| | 6 | NO | | ¥200 | |
| | 7 | NO | | ¥400 | |
| | 8 | NO | | ¥200 | |
| | 9 | OK | | ¥200 | |
| | 10 | NO | | ¥100 | |
| | 11 | OK | | ¥200 | |
| | 12 | NO | | ¥0 | |
| A2 | 1 | NO | OK | NO | ¥1500 |
| | 2 | (NO) | | (NO) | |
| | ... | | | | |
| | 15 | NO | | NO | |
| A0 | 1 | OK | — | ¥200 | — |
| A0 | 2 | OK | — | ¥50 | — |
| A0 | 3 | OK | — | ¥300 | — |
| ... | ... | ... | ... | ... | ... |

US 7,287,167 B2

RECORD MEDIUM, RECORDING APPARATUS FOR RECORD MEDIUM, RECORDING METHOD FOR RECORD MEDIUM, REPRODUCING APPARATUS FOR RECORD MEDIUM, REPRODUCING MEDIUM FOR RECORD MEDIUM, AND DATA OUTPUT CONTROLLING METHOD

BACKGROUND OF THE INVENTION

1. Field of the Invention

The present invention relates to a record medium, a recording apparatus for a record medium, a recording method for a record medium, a reproducing apparatus for a record medium, a reproducing method for a record medium, and a data output controlling method that are applicable for content data.

2. Description of the Related Art

As record mediums for music data, CD (Compact Disc) and MD (Mini Disc) (trade mark) are becoming common. As other record mediums, CD-ROM and DVD-ROM (Digital Versatile Disc or Digital Video Disc), which is used for picture and music information, are known. These discs are read-only discs. Recently, optical discs of write once type and rewritable type such as CD-R (CD-Recordable) disc, CD-RW (CD-Rewritable) disc, DVD-R (DVD-Recordable) disc, DVD+RW disc, and DVD-RAM (Random Access Memory disc are becoming commercially used. Besides such record mediums, electronic music distribution (EMD) system is becoming commercially used.

CD has a family of discs. A CD of one type is an album CD of which a plurality of music programs are recorded. A CD of another type is a CD-single of which one to several music programs are recorded. In the electronic music distributing system, in most cases, music data can be downloaded and charged in the unit of a music program.

In the case of a CD album, music programs are recorded in the order selected with the thought of the album producer. In other words, since the album producer produces an album in consideration of the order of music programs thereof, he or she desires the listener to listen the album in succession from the beginning to the end. However, actually, a user tends to copy only his or her desired part of an album. Therefore, there is a problem of which the user cannot know the thought of the album producer. Thus, whenever music data is sold in the unit of an album, it is desired to cause the music data to be copied in the unit of an album so that the thought of the album producer is transmitted to the user who copies the album.

OBJECTS AND SUMMARY OF THE INVENTION

It is an object of the present invention to provide a recording method for a record medium that solves the above-mentioned problem.

It is another object of the present invention to provide a recording apparatus for a record medium that solves the above-mentioned problem.

It is another object of the present invention to provide a reproducing method for a record medium that solves the above-mentioned problem.

It is another object of the present invention to provide a data output controlling method for a record medium that solves the above-mentioned problem.

It is another object of the present invention to provide a record medium that solves the above-mentioned problem.

According to the present invention, there is provided a recording method for a record medium, comprising the steps of adding right information containing at least copyright management information to at least one of a plurality of pieces of input data, and performing a signal process for the plurality of pieces of the input data in the unit of data to which the right information has been added so as to record the processed data to the record medium.

According to the present invention, there is provided a recording apparatus for a record medium, comprising a first adding circuit portion for adding right information to one of a plurality of pieces of input data, a second adding circuit portion for adding right information to the plurality of pieces of the input data in the unit of the plurality of pieces of the input data, a signal processing portion for performing a signal process for data to which the right information has been added so as to record the processed data to the record medium, a recording portion for recoding data to the record medium corresponding to output data of said signal processing portion, and a selecting circuit portion for selectively supplying output data of said first adding circuit portion or output data of said second adding circuit portion to said signal processing portion.

According to the present invention, there is provided a recording method for a record medium, comprising the steps of performing an encrypting process for at least one of a plurality of pieces of input data, and performing a signal process for the plurality of pieces of the input data in the unit of data for which the encrypting process has been performed so as to record the processed data to the record medium.

According to the present invention, there is provided a recording apparatus for a record medium, comprising a first encrypting circuit portion for performing an encrypting process for one of a plurality of pieces of input data, a second encrypting circuit portion for performing an encrypting process for a plurality of pieces of the input data in the unit of the plurality of pieces of the input data, a signal processing portion for performing a signal process for the encrypted data so as to record the processed data to the record medium, a recording portion for recording data to the record medium corresponding to output data of said signal processing portion, and a selecting circuit portion for selectively supplying output data of said first encrypting circuit portion or output data of said second encrypting circuit.

According to the present invention, there is provided a recording method for a record medium, comprising the steps of adding right information containing at least copyright management information to a plurality of pieces of input data in the unit of at least one of the plurality of pieces of the input data, performing an encrypting process for the data to which the right information has been added, adding right information containing at least copyright management information to the plurality of pieces of the data in the unit of the plurality of pieces of the data for which the encrypting process has been performed, performing an encrypting process for the data to which the right information has been added, performing a signal process for the plurality of pieces of the data for which the encrypting process has been performed, and recording the data for which the signal process has been performed to the record medium.

According to the present invention, there is provided a reproducing method for a record medium, comprising the steps of reading at least key information from data that is read from the record medium, determining whether an encoding process containing at least an encrypting process has been performed for data that has been read from the record medium in the unit of at least one of a plurality of pieces of the data or an encoding process containing at least an encrypting process has been performed for the data that has been read from the record medium in the unit of the plurality of pieces of the data, decoding the plurality of pieces of data that has been read from the record medium in the unit of one of the plurality of the data using the key information when the determined result at the determining step represents that the encoding process has been performed for the data that has been read from the record medium in the unit of one of the plurality of pieces of the data, and decoding the plurality of pieces of data that has been read from the record medium using the key information in the unit of the plurality of pieces of the data when the determined result at the determining step represents that the encoding process has been performed for the data that has been read from the record medium in the unit of the plurality of pieces of the data.

According to the present invention, there is provided a reproducing method for a record medium, comprising the steps of reading right information containing at least copyright management information from data that has been read from a record medium, determining whether or not data that is read from the record medium corresponding to a data read command is capable of being read in the unit of one of a plurality of pieces of the data corresponding to the right information that has been read, and reading the data designated with the data read command from the record medium when the determined result at the determining step represents that the data is capable of being read in the unit of one of the plurality of pieces of the data.

According to the present invention, there is provided a reproducing method for a record medium, comprising the steps of reading right information containing at least copyright management information from data that has been read from a record medium, determining whether or not a plurality of pieces of data are capable of being read corresponding to the right information that has been read when a read command for reading a plurality of pieces of the data is issued, and reading the plurality of pieces of the data designated with the read command when the determining step represents that the data is capable of being read in the unit of a plurality of pieces of the data.

According to the present invention, there is provided an output controlling method for data, comprising the steps of determining whether data is capable of being read in the unit of one or a plurality of pieces of the data corresponding to right information containing at least copyright management information added to the data when a data read command for reading one of the plurality of pieces of data is issued, and controlling the output of the data designated with the data read command when the determined result at the determining step represents that the data is capable of being read in the unit of one of the plurality of pieces of the data.

According to the present invention, there is provided a record medium on which data has been recorded in the unit of which right information containing at least copyright management information has been added or in the unit of which an encrypting process has been performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a schematic diagram showing an example of right information according to the present invention;

DETAILED DESCRIPTION OF THE PREFERRED EMBODIMENTS

Figure 1:
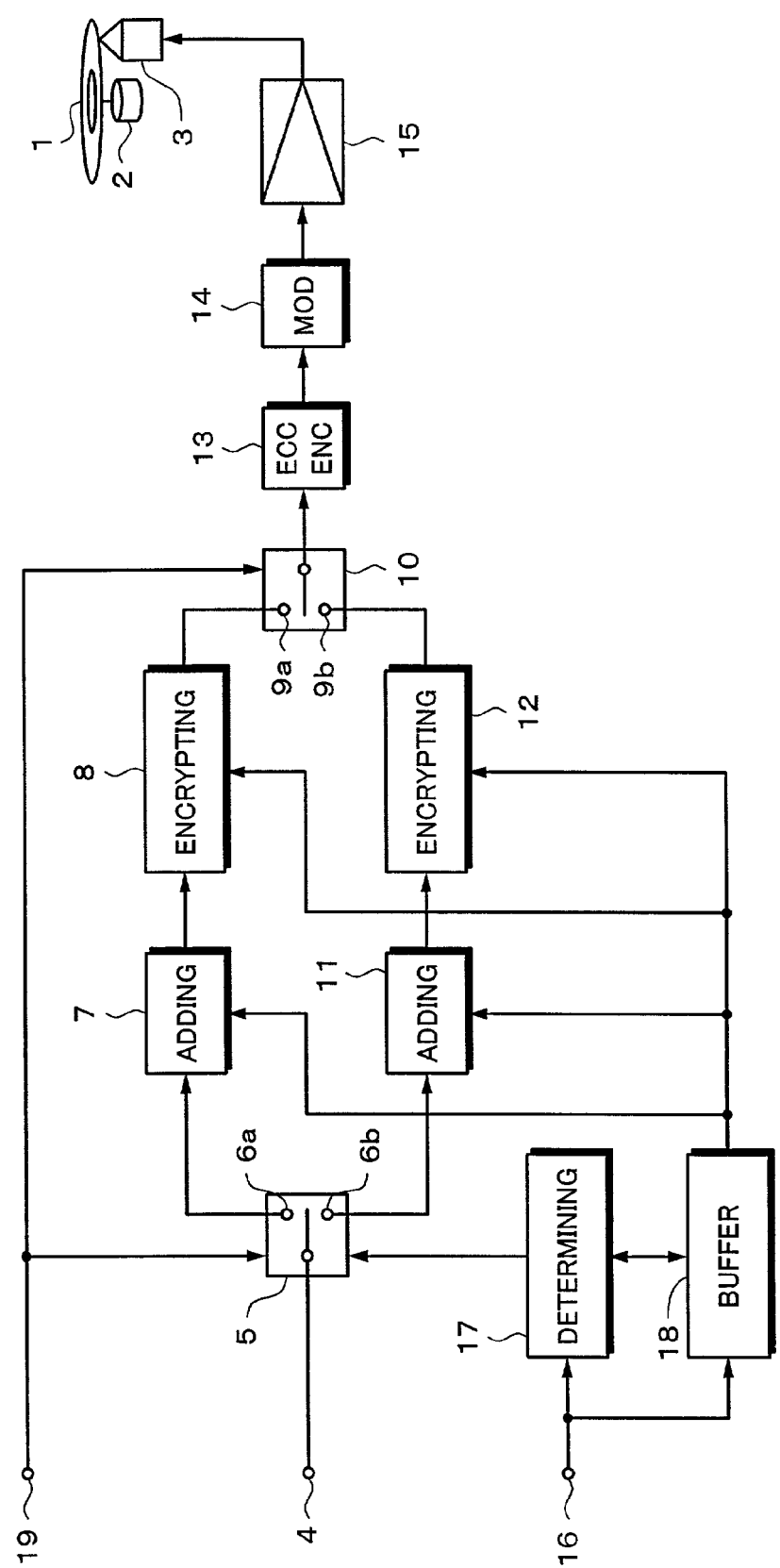
FIG. 1 is a block diagram showing an example of the structure of a recording apparatus according to the present invention.

Next, the case of which the present invention is applied for music data as contents will be described. FIG. 1 shows the structure of a recording apparatus according to the present invention. In FIG. 1, reference numeral 1 represent a recordable optical disc. The optical disc 1 is rotated and driven by a spindle motor 2 at for example constant linear velocity or constant angular velocity. The recording apparatus has an optical pickup 3. The optical pickup 3 is disposed so that it faces one surface of the optical disc 1. The optical pickup 3 radiates laser light to a record layer of the optical disc 1 so as to record data thereon and read data therefrom. The optical pickup 3 is moved in the radius direction of the optical disc 1 by a mechanism (not shown) driven by a feed motor (not shown).

The optical disc 1 is a recordable optical disc—for example, a phase-change type optical disc. The optical disc 1 comprises a substrate, a record layer, and a protection layer. The substrate has optical permeability. The record layer is composed of a phase-change type record medium. The protection layer protects the record layer. The substrate of the optical disc 1 is formed by injection-molding for example polycarbonate resin. In this case, track guide grooves referred to as pre-grooves are formed on one surface of the substrate. A land is formed between pre-grooves formed on the substrate of the optical disc 1. The pre-grooves are successively formed spirally from the inner periphery to the outer periphery of the optical disc 1.

The pre-grooves are wobbled in the radius direction of the optical disc 1 for controlling the rotation of the optical disc 1 and obtaining a recording reference signal. Data is recorded in pre-grooves of the optical disc 1 or between a pre-groove and a corresponding land thereof. The pre-grooves of the optical disc 1 that are wobbled are recorded as address information. On a CD-R disc and a CD-RW disc, with address information detected as wobbled pre-grooves, the optical pickup 3 is moved to a desired write position of the disc. The optical pickup 3 writes data to the desired write position.

In FIG. 1, reference numeral 4 represents an input terminal for a content such as music data that is recorded to the optical disc 1. To reduce the record space of the optical disc 1, the music data that is supplied to the input terminal 4 has been compression-encoded. Input music data that is input from the input terminal 4 is supplied to an input terminal of a switch circuit 5. An adding circuit 7 and an encrypting circuit 8 are successively connected to an output terminal 6a that is one of two output terminals of the switch circuit 5. The adding circuit 7 adds digital data with respect to right information such as copyright management information and charging condition information to music data that is output from the output terminal 6a. The right information includes for example information representing whether to permit and prohibit copy operation of music data, information representing the number of permitted copy generations, and information representing whether or not music program is free. The adding circuit 7 embeds the digital the above-mentioned data with respect to right information in the music data in the unit of a music program. As an example of the encrypting method of the encrypting circuit 8, DES, RSA, or the like can be used. DES is an encrypting method of which data is encrypted block by block. RSA is an encrypting method of public key encryption type of which a key used in the encrypting process is different from a key used in the decrypting process. Encrypted music data that is output form the encrypting circuit 8 is supplied to an input terminal 9a of a switch circuit 10.

An adding circuit 11 and an encrypting circuit 12 are connected between an output terminal 6b as the other terminal of the switch circuit 5 and an input terminal 9b of the switch circuit 10. Encrypted music data that is output from the encrypting circuit 12 is supplied to the input terminal 9b of the switch circuit 10. The function of the adding circuit 7 is the same as the function of the adding circuit 11 in that each of them adds or embeds the above-mentioned right information to music data. However, the adding circuit 7 embeds the above-mentioned data with respect to right information to music data in the unit of a music program, whereas the adding circuit 11 embeds the above-mentioned data with respect to right information to music data in the unit of a plurality of music programs (namely, in the unit of an album). Likewise, the encrypting circuit 8 encrypts music data in the unit of a music program, whereas the encrypting circuit 12 encrypts music program in the unit of a plurality of music programs (namely, in the unit of a album). In the structure shown in FIG. 1, after the adding circuit 7 or the adding circuit 11 embeds the above-mentioned data with respect to right information to music data, the encrypting circuit 8 or the encrypting circuit 12 performs the above-mentioned encrypting process. However, it should be noted that the present invention is not limited to such an example. In other words, alternatively, after music data is encrypted, the above-mentioned data with respect to right information can be embedded to the encrypted music data.

Output data selected by the switch circuit 10 (namely, encrypted data that is output from the encrypting circuit 8 or the encrypting circuit 12) is supplied to an error correction encoder 13. The error correction encoder 13 performs an encoding process for the supplied data with error correction code. Output data of the error correction encoder 13 is supplied to a modulating circuit 14. The modulating circuit 14 performs a modulating process (for example, EFM modulating process) for the output data of the error correction encoder 13 and a process for adding a frame synchronous signal to the modulated data.

Record data that is output from the modulating circuit 14 is supplied to a laser diode as a light source of the optical pickup 3 through an amplifier (laser driver) 15. The amplifier 15 generates a drive signal having a predetermined level that causes record data supplied from the modulating circuit 14 to be recorded to the optical disc 1. The drive signal that is output from the amplifier 15 is supplied to the laser diode of the optical pickup 3. Laser light corresponding to the drive signal is radiated to the optical disc 1 and thereby data is recorded to the optical disc 1. Address data for record data is obtained by a demodulating portion (not shown). The demodulating portion demodulates a signal of which wobbled groves of the optical disc 1 are detected. Corresponding to the address data obtained by the demodulating portion, the optical pickup 3 is moved in the radius direction of the optical disc 1 by a feed mechanism (not shown) so that record data is recorded from a desired address of the optical disc 1.

In FIG. 1, the above-mentioned data with respect to right information and the key information are supplied to an input terminal 16. The above-mentioned data with respect to right information and the key information are supplied to a determining circuit 17 and a buffer 18. The determining circuit 17 determines whether the supplied data with respect to right information and the key information are data in the unit of a music program or in the unit of an album. The buffer 18 stores the input data with respect to right information and key information. The above-mentioned data with respect to right information and the key information are supplied from the buffer 18 to the adding circuit 7 and the adding circuit 11. The key information that is read from the buffer 18 is supplied to the encrypting circuit 8 and the encrypting circuit 12. The encrypting circuit 8 and the encrypting circuit 12 encrypt the data that is output from the adding circuit 7 and the adding circuit 11 using the supplied key information, respectively. As was described above, output data of the encrypting circuit 8 or the encrypting circuit 12 is recorded to the optical disc 1.

Figure 3:
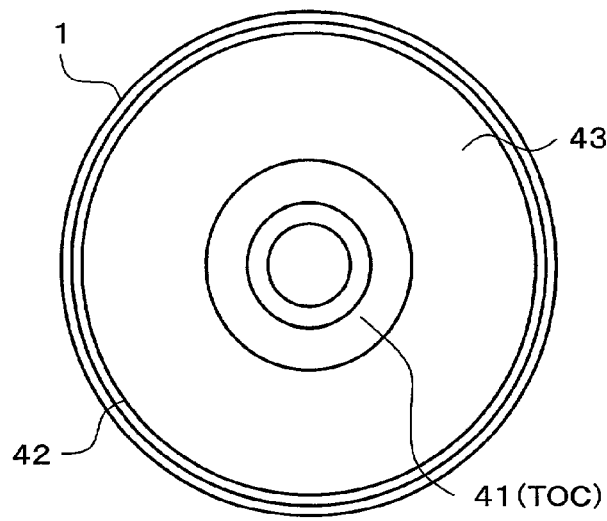
FIG. 3 is a schematic diagram for explaining the structure of an optical disc according to the present invention.

The above-mentioned data with respect to right information and the key information are recorded to the optical disc 1 along with music data as content data in the unit of a music program or in the unit of an album. In this case, as with content data, the above-mentioned data with respect to right information and the key information may be recoded in a program area of the optical disc 1. However, it is preferred that the above-mentioned data with respect to right information and the key information be recorded in a predetermined record area of the optical disc 1. For example, the predetermined record area of the optical disc 1 may be a management data area of the optical disc 1. As shown in FIG. 3, a lead-in area 41 is formed on the innermost periphery of the optical disc 1. In addition, a lead-out area 42 is formed on the outermost periphery of the optical disc 1. The above-mentioned record data is recorded in a program area 43 formed between the lead-in area 41 and the lead-out area 42. The above-mentioned data with respect to right information and the key information are recorded in a management data area formed in the lead-in area 41. In the management data area of the lead-in area 41, TOC (Table Of Contents) data is recorded. The TOC data contains information representing the record positions of the above-mentioned data with respect to right information and the key information, information representing whether the above-mentioned data with respect to right information and the key information have been added to each of a plurality of music programs of music data and the resultant data has been encrypted in the unit of a music program, and information representing the above-mentioned data with respect to right information and the key information have been added to music data and the resultant data has been encrypted in the unit of an album. In addition, a start/end signal is supplied to an input terminal 19. The start/end signal is a signal for defining a start timing and an end timing in the unit of a music program or in the unit of an album. The start/end signal causes the operations of the switch circuit 5 and the switch circuit 10 to be controlled. The recording apparatus shown in FIG. 1 can be applied for a read-only optical disc mastering (recording) apparatus. In this case, the optical disc 1 is a mastering recordable disc.

The above-mentioned data with respect to right information supplied from the input terminal 16 contains designation information representing whether the adding circuit 7 and the encrypting circuit 8 perform their processes in the unit of a music process or the adding circuit 11 and the encrypting circuit 12 perform their processes in the unit of an album. Thus, when the designation information represents the processes in the unit of a music program, the adding circuit 7 and the encrypting circuit 8 perform the corresponding processes for the input music data in the unit of a music program. In other words, corresponding to the designation information, when a music program is started, the output terminal 6a of the switch circuit 5 is selected. In addition, the input terminal 9a of the switch circuit 10 is selected. When the encrypting process for the music program is completed, the switch circuit 5 and the switch circuit 10 are placed in their neutral positions as shown in FIG. 1. Under the control of the switch circuit 5 and the switch circuit 10, the adding circuit 7 adds the above-mentioned data with respect to right information and the key information to music data in the unit of a music program. The encrypting circuit 8 encrypts the music data in the unit of a music program. Music data encrypted by the encrypting circuit 8 in the unit of a music program is supplied to the optical pickup 3 through the error correction encoder 13, the modulating circuit 14, and the amplifier 15. The optical pickup 3 radiates laser light, which corresponds to a drive signal supplied from the amplifier 15, to the optical disc 1. As a result, the resultant music data is recorded to a predetermined address of the optical disc 1. In contrast, when the designation information represents the processes in the unit of an album, the adding circuit 11 adds the above-mentioned data with respect to right information and the key information to music data in the unit of an album. The encrypting circuit 12 encrypts the resultant music data in the unit of an album. In the above-described example, the TOC data contains the designation information representing whether the adding process and the encrypting process are performed for music data (composed of a plurality of music programs) in the unit of a music program or in the unit of an album. Alternatively, the designation information may represent whether those processes are performed in the unit or a music program for the entire optical disc 1 or in the unit of an album.

Figure 2:
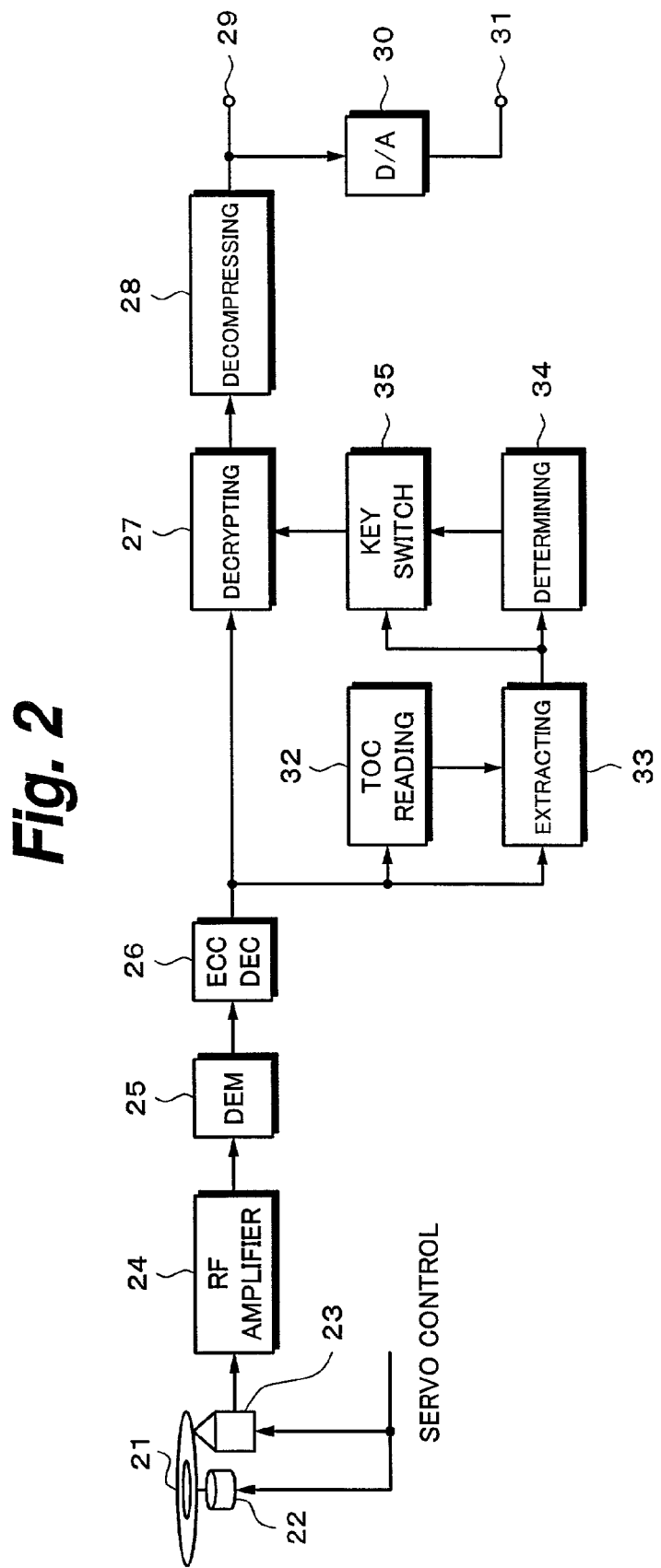
FIG. 2 is a block diagram showing an example of the structure of a reproducing apparatus according to the present invention.

FIG. 2 shows an example of the structure of a reproducing apparatus that reproduces data from an optical disc to which the data has been recorded by the recording apparatus shown in FIG. 1. On an optical disc 21, music data, the above-mentioned data with respect to right information, and the key information have been recorded as encrypted music data. In FIG. 2, reference numeral 22 represents a spindle motor that rotates the optical disc 21 at constant linear velocity or constant angular velocity. Reference numeral 23 represents an optical pickup. The spindle motor 22 and the optical pickup 23 are driven by a servo circuit (not shown) in a predetermined manner. For example, the servo circuit causes the spindle motor 22 to rotate the optical disc 21 at constant angular velocity or constant linear velocity corresponding to an output signal supplied from the optical pickup 23. The servo circuit supplies a focus servo signal and a tracking servo signal to the optical pickup 23 so as to control the focus position of laser light radiated from the optical pickup 23 or the scanning position of the optical disc 21.

The optical pickup 23 radiates laser light to the optical disc 21. A four-divided photo-detector of the optical pickup 23 reads the reflected light of the optical disc 21 so as to read data recorded on the optical disc 21. A detected signal of the photo-detector is supplied to an RF amplifier 24. The RF amplifier 24 has a matrix amplifier (not shown). The matrix amplifier calculates detected signals of the photo-detector of the optical pickup 23 and thereby generates a reproduction (RF) signal, a wobbled pre-groove detected signal, a tracking error signal TE, and a focus error signal FE. The RF signal is supplied to a digital demodulating circuit 25. The wobbled pre-groove detected signal obtained as a push-pull signal by a matrix amplifier (not shown) is supplied to a demodulator (not shown). The tracking error signal TE and the focus error signal FE are supplied to the above-mentioned servo circuit (not shown). The servo circuit performs the above-mentioned control operation for the optical pickup 23 corresponding to the supplied tracking error signal TE and focus error signal FE. The demodulator obtains address data corresponding to the supplied wobbled pre-groove detection signal.

The demodulating circuit 25 demodulates an RF signal supplied from the RF amplifier 24 corresponding to EFM method. The demodulated data of the demodulating circuit 25 is supplied to an error correcting circuit 26. The error correcting circuit 26 corrects an error of the demodulated data supplied from the demodulating circuit 25. Output data of the error correcting circuit 26 is supplied to a decrypting circuit 27. The decrypting circuit 27 decrypts the output data of the error correcting circuit 26. Output data of the decrypting circuit 27 is supplied to a decompressing circuit 28. The decompressing circuit 28 decompresses the compressed data. An output signal of the decompressing circuit 28 is output as a digital audio signal to an output terminal 29. An output signal of the decompressing circuit 28 is supplied to a D/A converter 30. The D/A converter 30 converts the output signal of the decompressing circuit 28 into an analog signal and outputs the analog signal as an analog audio signal to an output terminal 31.

In FIG. 2, a TOC reading circuit 32 reads TOC data from the optical disc 21 corresponding to output data of the error correcting circuit 26. An extracting circuit 33 extracts the above-mentioned data with respect to right information and the key information from the output data of the error correcting circuit 26. As was described above, the data with respect to right information and the key information have been recorded in the lead-in area of the optical disc 21. Normally, when the optical disc 21 is loaded to the reproducing apparatus or when the power of the reproducing apparatus is turned on while the optical disc 21 has been loaded thereto, the information of the lead-in area is initially read from the optical disc 21 by the optical pickup 23. Corresponding to information that represents the record position and that is contained in the TOC information or output data of the error correcting circuit 26, the above-mentioned data with respect to right information and the key information recorded in the management data area of the optical disc 21 are read from the optical disc 21. At that point, as was described above, information representing whether the above-mentioned adding process and encrypting process are performed for music data (composed of a plurality of music programs) recorded on the optical disc 21 in the unit of a music program or in the unit of an album is read from the TOC data.

The above-mentioned data with respect to right information extracted by the extracting circuit 33 is supplied to the determining circuit 34. The determining circuit 34 determines whether music data as content data recorded on the optical disc 21 has been processed in the unit of a music program or in the unit of an album corresponding to information that is read from the TOC data. In addition, the determining circuit 34 performs a determination about copyright management contained in the data with respect to right information extracted by the extracting circuit 33. Corresponding to an output of the determining circuit 34, a key switch circuit 35 is controlled. The key switch circuit 35 selects key information extracted by the extracting circuit 33 corresponding to an output signal of the determining circuit 34 and supplies the selected key information to a decrypting circuit 37. The decrypting circuit 37 decrypts the output data of the error correcting circuit 26 using the key information supplied through the determining circuit 34.

Figure 4A:
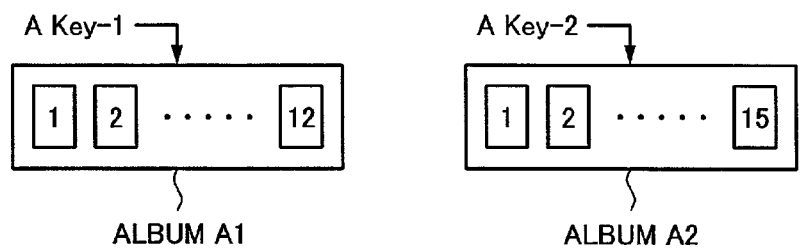
FIGS. 4A and 4B are schematic diagrams for explaining an example of an encrypting process according to the present invention.
Figure 4B:
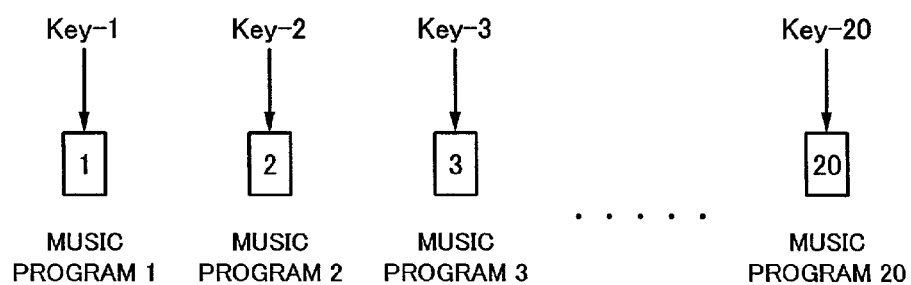

Next, with reference to FIGS. 4A and 4B, a process according to the present invention will be described. FIG. 4A shows a process (handling) in the unit of an album. In this case, album Al composed of music program 1 to music program 12 is encrypted with encrypting key AKey-1. Likewise, album A2 composed of music program 1 to music program 15 is encrypted with encrypting key AKey-2. It should be noted that the number of albums recorded on one disc is not limited to one. For example, when music data is compression-encoded, music data as contents for several CDs and several ten CDs can be recorded on one disc according to the present invention. FIG. 4B shows a process (handling) in the unit of a music program. Music program 1 to music program 20 are encrypted with keys Key-1 to Key-20, respectively. In the recording apparatus shown in FIG. 1, corresponding to designation information supplied to an input terminal 16, the encrypting process in the unit of an album shown in FIG. 4A or the encrypting process in the unit of a music program shown in FIG. 4B can be selected.

Figure 5:
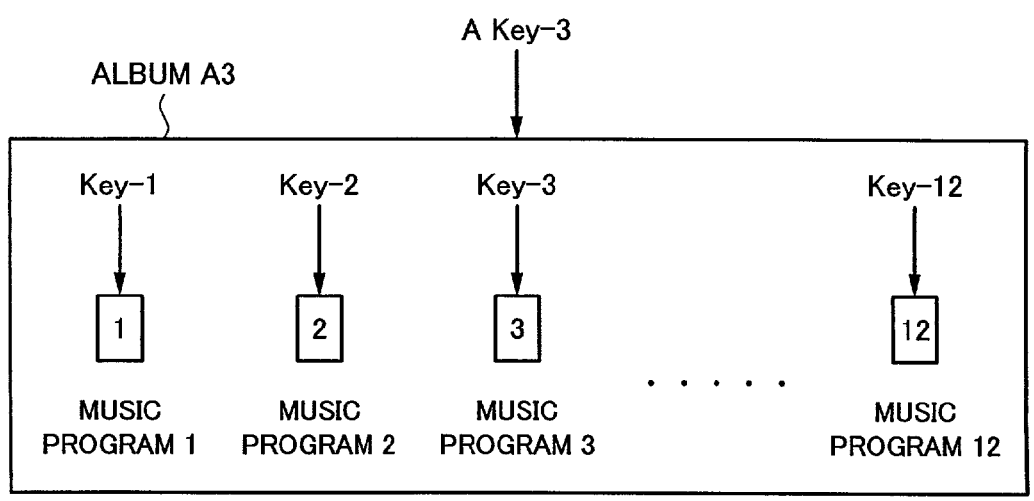
FIG. 5 is a schematic diagram for explaining another example of the encrypting process according to the present invention.

FIG. 5 shows another example of a process. In this example, music program 1 to music program 12 of album A3 are encrypted with keys Key-1 to Key-12, respectively. In addition, album A3 is encrypted with key AKey-3. In the example shown in FIG. 5, music data is redundantly encrypted in the unit of a music program and in the unit of an album.

FIG. 6 shows a more real example of the above-mentioned right information of music data recorded on one optical disc. As was described above, the right information is recorded in the management data area of the lead-in area of the optical disc.

FIG. 6 shows that album Al is composed of music program 1 to music program 12 and whether each of the music programs can be copied (OK). In addition, FIG. 6 shows that album A2 is composed of music program 1 to music program 15 and that each of the programs is prohibited from being copied (but album A2 can be copied in the unit of an album). In FIG. 6, A1 and A2 represent album titles. FIG. 6 also shows whether or not each of albums can be copied and whether or not each of music programs can be copied. In FIG. 6, A0 represents no album, but a music program. In the example shown in FIG. 6, music data of at least three music programs are recorded as non-album music programs.

As with album A2 shown in FIG. 6, since music data is copied in the unit of an album, the thought of the producer of album A2 can be prevented from being changed or lost due to the copy operation.

Although the above-described embodiment deals with a data record medium such as an optical disc, the present invention can be applied for the case that as with an electronic music distributing system, data is transmitted through a network. In this case, in FIG. 6, right information shown on the right side sectioned by a dotted line is used. The album field and the music program field on the left side sectioned by the dotted line are used along with the right side portion sectioned by the dotted line.

When music data is electronically distributed through a network such as Internet, the charging condition (for purchase (downloading)) is defined for each of music program 1 to music program 12. In addition, the charging condition for downloading each album is defined. On the other hand, album A2 is prohibited from being downloaded in the unit of a music program. In other words, the purchase (downloading) of album A2 is permitted in the unit of an album. In addition, the charging condition for each non-album music program (namely, album field=A0) is defined. Since the charging field of music program 12 of album A1 is ¥ 0, the downloading thereof is free. In other words, music program 12 of album A1 is a bonus program.

Figure 7:
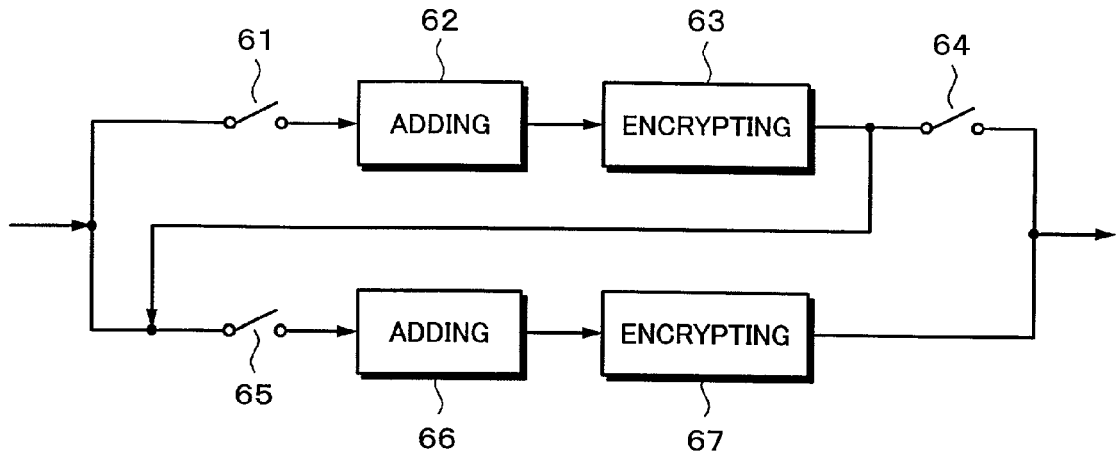
FIG. 7 is a block diagram showing the structure of a part of a recording apparatus shown in FIG. 1 according to a modification of the present invention.

FIG. 7 shows an example of the structure of which after an encoding process is performed in the unit of a music program, an encoding process is performed in the unit of an album. In the example shown in FIG. 7, an adding circuit 62 and an encrypting circuit 63 are disposed. The adding circuit 62 adds the above-mentioned data with respect to right information and key information to the supplied music data in the unit of a music program. The encrypting circuit 63 encrypts output data of the adding circuit 62 in the unit of a music program. In addition, an adding circuit 66 and an encrypting circuit 67 are disposed. The adding circuit 66 adds the above-mentioned data with respect to right information and key data to the supplied music data in the unit of an album. The encrypting circuit 67 encrypts output data of the adding circuit 66. In the example shown in FIG. 7, switch circuits 61, 64, and 65 are disposed. By controlling the opening and closing operations of the switch circuits 61, 64, and 65, a desired process can be performed. In the case that the switch circuits 61 and 64 are turned on and that the switch circuit 65 is turned off, the adding circuit 62 and the encrypting circuit 63 perform the adding process and the encrypting process for the supplied music data in the unit of a music program, respectively. In the case that the switch circuits 61 and 64 are turned off and that the switch circuit 65 is turned on, the adding circuit 66 and the encrypting circuit 67 perform the adding process and the encrypting process for the music data in the unit of an album, respectively. In the case that the switch circuit 61 is turned on, that the switch circuit 65 is turned on, and that the switch circuit 64 is turned off, as shown in FIG. 5, the adding circuit 62 and the encrypting circuit 63 perform the adding process and the encrypting process for the supplied music program in the unit of a music program, respectively. Thereafter, the adding circuit 66 and the encrypting circuit 67 perform the adding process and the encrypting process for the music data supplied from the adding circuit 62 and the encrypting circuit 63 in the unit of an album.

Figure 8:
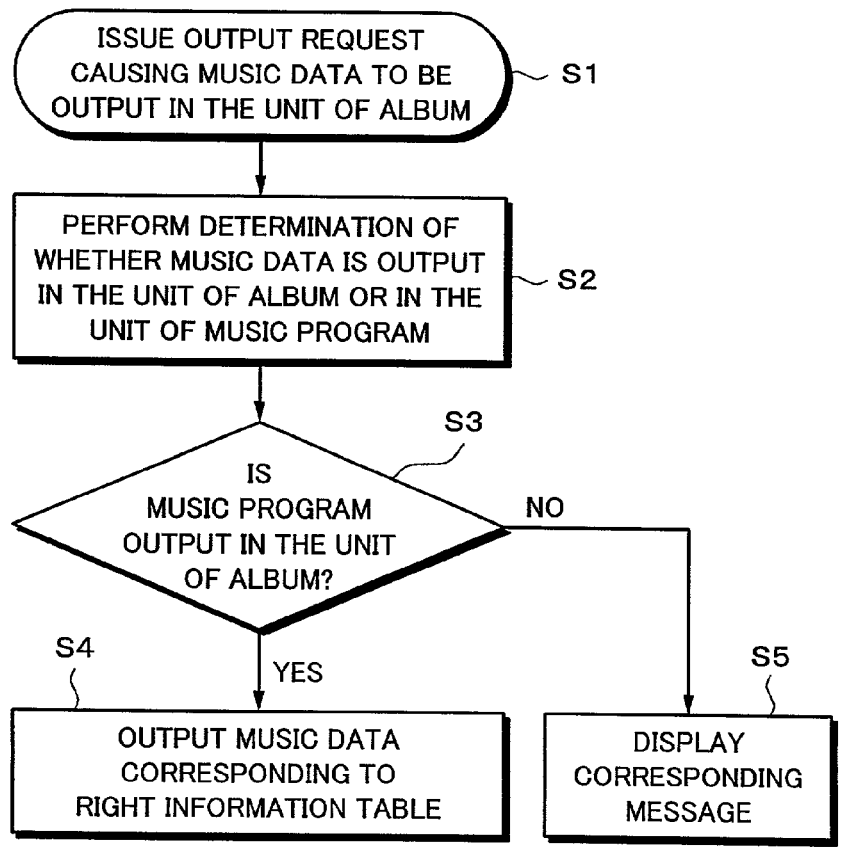
FIG. 8 is a flow chart for explaining a reproducing process according to the present invention.

Next, with reference to FIGS. 8 and 9, the reproducing process of the reproducing apparatus shown in FIG. 2 or the electronic distribution for music data will be described. At step S1 shown in FIG. 8, when an operation button (not shown) or the like of the reproducing apparatus is operated, an output request that causes music data to be output in the unit of an album is generated. At that point, with reference to a right information table shown in FIG. 6, a determination is performed (at step S2). At step S3, corresponding to the right information table shown in FIG. 6, it is determined whether or not music data as a required content can be reproduced or output in the unit of an album. When the determined result at step S3 is Yes (namely, the music data can be reproduced or output in the unit of an album), corresponding to the condition represented in the copy field of FIG. 6, the required content is reproduced or output (at step S4). When the determined result at step S3 is No (namely, the required content cannot be reproduced or output in the unit of an album, but in the unit of a music program) (in other words, album field=A0), a corresponding message is displayed on a displaying portion (not shown) of the reproducing apparatus (at step S5). For example, the message displayed on the displaying portion is "Sorry, there is no requested album ! Do you like to output a music program ?". Corresponding to the displayed message, the user can select another content of music data.

Figure 9:
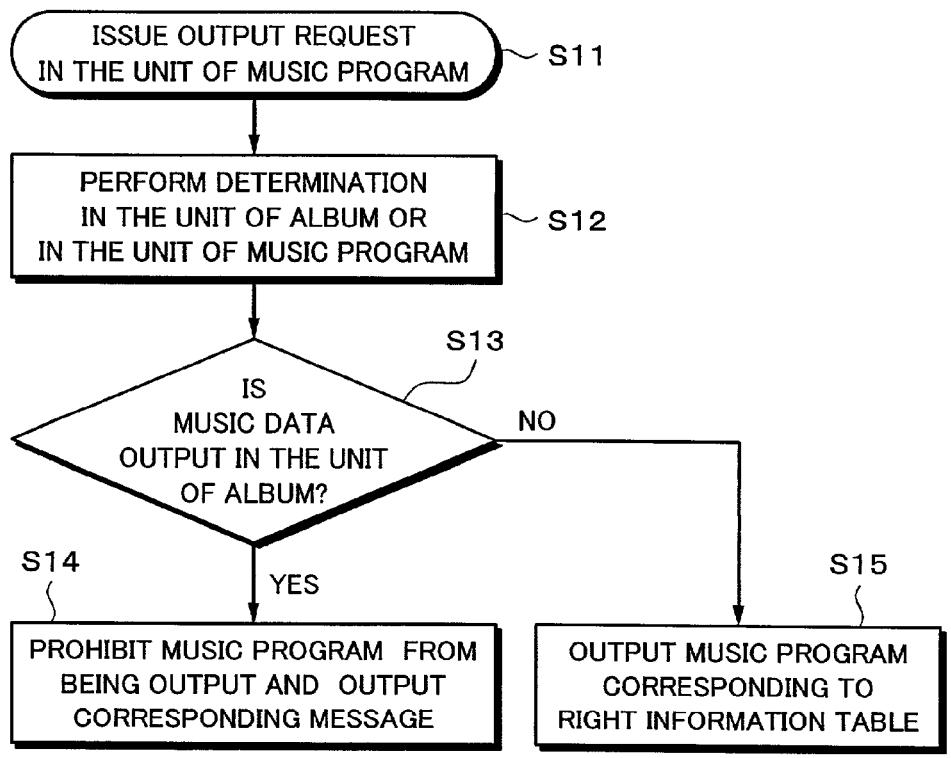
FIG. 9 is a flow chart for explaining the reproducing process according to the present invention.

FIG. 9 is a flow chart showing a process in the case that an output request that causes music data to be output in the unit of a music program is issued in the reproducing apparatus shown in FIG. 2 or in the electronic music distributing system. At step S11, when an operation button (not shown) of the reproducing apparatus or a terminal unit of the electronic music distributing system is pressed, an output request that causes music data to be output in the unit of a music program is generated. At step S12, with reference to the right information table shown in FIG. 6, the determination is performed (at step S12). At step S13, it is determined whether or not music data as the requested content is output only in the unit of an album corresponding to the right information table shown in FIG. 6. When the determined result at step S13 is No (namely, music data can be output in the unit of a music program), the music program is reproduced or output corresponding to the condition represented in the copy field of the table shown in FIG. 6 (at step S15). When the determined result at step S13 is Yes (namely, music program is output only in the unit of an album), as with the case shown in FIG. 8, a corresponding message is displayed on the displaying portion (not shown) of the apparatus (at step S14). For example, the message is "Music program is output only in the unit of an album". Corresponding to the message displayed on the displaying portion, the user can select another content as music data.

Figure 10:
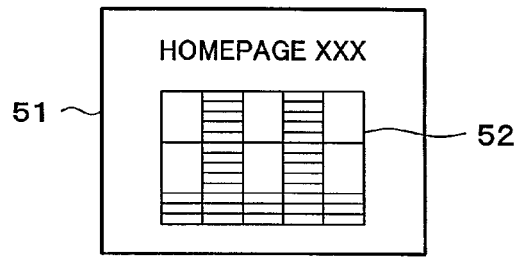
FIG. 10 is a schematic diagram for explaining an electronic music distributing system according to the present invention.

As was described above, the present invention can be applied for the distributing side of the electronic music distributing system. In this case, as shown in FIG. 10, along with a list of music programs that can be downloaded, the right information table that represents whether music data can be downloaded in the unit of an album or in the unit of a music program is displayed.

According to the present invention, as contents, audio data such as music data was mainly exemplified. However, the present invention can be applied for other contents of video data such as movies, data about books, and game software data.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A recording apparatus for recording individual audio programs and album groups of audio programs onto a record medium, comprising:
   a management information-selecting circuit for selecting audio programs and album groups for recording on the record medium;
   a first adding circuit for adding respective rights information individually to each of the selected audio programs, wherein the added rights information includes respective copyright information and charging condition information;
   a first encrypting circuit for encrypting the audio programs output from said first adding circuit;
   a second adding circuit for adding respective rights information to each of the selected album groups;
   a second encrypting circuit for encrypting the album groups output from said second adding circuit;
   wherein each album and each audio program is encrypted using different encryption keys; and
   a recording portion for recording the selected and encrypted audio programs and album groups onto the record medium.

* * * * *

UNITED STATES PATENT AND TRADEMARK OFFICE
CERTIFICATE OF CORRECTION

PATENT NO. : 7,287,167 B2  
APPLICATION NO. : 09/955888  
DATED : October 23, 2007  
INVENTOR(S) : Kageyasu Sako and Tatsuya Inokuchi It is certified that error appears in the above-identified patent and that said Letters Patent is hereby corrected as shown below:

Column 5, line 21, "the digital the above-" should read --the above- --;

Column 5, line 22, "mentioned data" should read --mentioned digital data--;

Column 5, line 30, "form" should read --from--;

Column 10, line 19, "as Internet" should read --as the Internet--;

Column 12, line 42, "program is" should read --program are--.

Signed and Sealed this

Fourteenth Day of October, 2008

JON W. DUDAS  
*Director of the United States Patent and Trademark Office*